US006873064B2

(12) United States Patent
Chen

(10) Patent No.: US 6,873,064 B2
(45) Date of Patent: Mar. 29, 2005

(54) IDENTIFICATION SYSTEM AND METHOD FOR THE SAME

(75) Inventor: Yu-Guang Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 116 days.

(21) Appl. No.: 10/174,949

(22) Filed: Jun. 20, 2002

(65) Prior Publication Data

US 2003/0045160 A1 Mar. 6, 2003

(30) Foreign Application Priority Data

Aug. 28, 2001 (TW) ....................................... 90121553 A
Aug. 28, 2001 (TW) .......................................... 90121553

(51) Int. Cl.[7] ............................................ H02J 307/152
(52) U.S. Cl. ....................................................... 307/152
(58) Field of Search ................................ 307/152, 147, 307/148; 370/468, 469, 492; 709/232; 707/10

(56) References Cited

U.S. PATENT DOCUMENTS 4,555,712 A * 11/1985 Arway et al. .................. 347/7
5,305,317 A * 4/1994 Szczepanek ................ 370/257
5,596,575 A * 1/1997 Yang et al. ................. 370/468
5,675,813 A * 10/1997 Holmdahl ................... 713/310
6,167,403 A * 12/2000 Whitmire et al. ............. 707/10
6,243,756 B1 * 6/2001 Whitmire et al. ........... 709/232
6,459,700 B1 * 10/2002 Hoang ........................ 370/401

* cited by examiner

*Primary Examiner*—Pia Tibbits
(74) *Attorney, Agent, or Firm*—Birch, Stewart, Kolasch & Birch, LLP

(57) ABSTRACT

A connector that may indicate an edition of a connecting interface of a computer, includes a host controller, and an indicator electrically connected to the host controller. The host controller includes a judging device used to judge a transmitting velocity between the host of the computer and the peripheral device. Thus, the indicator may be adapted to indicate the edition of the connecting interface according to the transmitting velocity between the host of the computer and the peripheral device.

13 Claims, 2 Drawing Sheets

IDENTIFICATION SYSTEM AND METHOD FOR THE SAME

BACKGROUND OF THE INVENTION

1. Field of the Invention

The present invention relates to an identification system and method that may indicate the edition of a connecting interface of a computer, wherein the host controller includes a judging device that may judge the transmitting velocity between the host of the computer and the peripheral device. Thus, the indicator may be adapted to indicate the edition of the connecting interface according to the transmitting velocity between the host of the computer and the peripheral device.

2. Description of the Related Art

A connecting interface is mounted between the main board (or the host) of a computer and a peripheral device. The connecting interface usually includes connectors (such as the PS/2 connector that may be connected to the mouse, the USB connector or the like) that may be connected to peripheral devices of different types, a micro-controller that may be used to control delivery of data and commands, and buses mounted between the connectors and the micro-controller, thereby forming a hardware that may co-operate with a software which is made according to the interface standard, so that the host of the computer may correctly transmitting the commands and the data to the peripheral devices, thereby driving each of the peripheral devices to work.

The connecting interface connected to the peripheral device may be previously built in the main board (or the host) of the computer, such as the interfaces of PS/2, LPT, RS-232, IrDA, IDE, USB or the like. For example, the connecting interface of USB (universal serial bus) includes two specifications, that is, an old edition of USB 1.1 whose maximum transmitting rate is 12 Mb/s, and a new edition of USB 2.0 whose maximum transmitting rate is 480 Mb/s.

Recently, the host of the computer may support the new edition of USB 2.0, but most of the peripheral devices only support the old edition of USB 1.1. Thus, if the host of the computer may support the new edition of USB 2.0 and the peripheral device may only support the old edition of USB 1.1, the peripheral device may only perform the transmitting work at the speed regulated by the old edition of USB 1.1. That is, the maximum transmitting rate between the host of the computer and the peripheral device is 12 Mb/s only.

Accordingly, the peripheral device may perform the transmitting work at the speed regulated by the connecting interface of the new 2.0 edition only under the condition that both of the host of the computer and the peripheral device may support the connecting interface of the new edition simultaneously. If the peripheral device only supports the connecting interface of the old edition, the peripheral device may only perform the transmitting work at the speed regulated by the connecting interface of the old edition.

However, the consumer cannot previously or easily know if the peripheral device supports the connecting interface of the new edition, thereby greatly causing disturbance and inconvenience to the consumer when purchasing the computer.

SUMMARY OF THE INVENTION

The present invention has arisen to mitigate and/or obviate the above-mentioned problem.

The primary objective of the present invention is to provide an identification system and method that may indicate the edition of a connecting interface of a computer, wherein the connector includes a judging means and an indicator, so that the user may know the transmitting state between the computer and the peripheral device easily.

The difference between the old edition and the new edition of the connecting interface is in the transmitting velocity. The judging means of the connector of the present invention may judge the transmitting velocity between the computer and the peripheral device, and the indicator may have a mating indication according to different transmitting velocities, so that the user may directly identify if the peripheral device may support the standard of the new edition of the connecting interface according to the indication state of the indicator.

In accordance with the present invention, there is provided an identification system that may indicator an edition of a connecting interface of a computer, comprising:

a host controller; and at least one indicator electrically connected to the host controller.

The host controller includes a judgement device that may judge a transmitting velocity between the host of the computer and the peripheral device. Thus, the indicator may be adapted to indicate the edition of the connecting interface according to the transmitting velocity between the host of the computer and the peripheral device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE INVENTION

Figure 1:
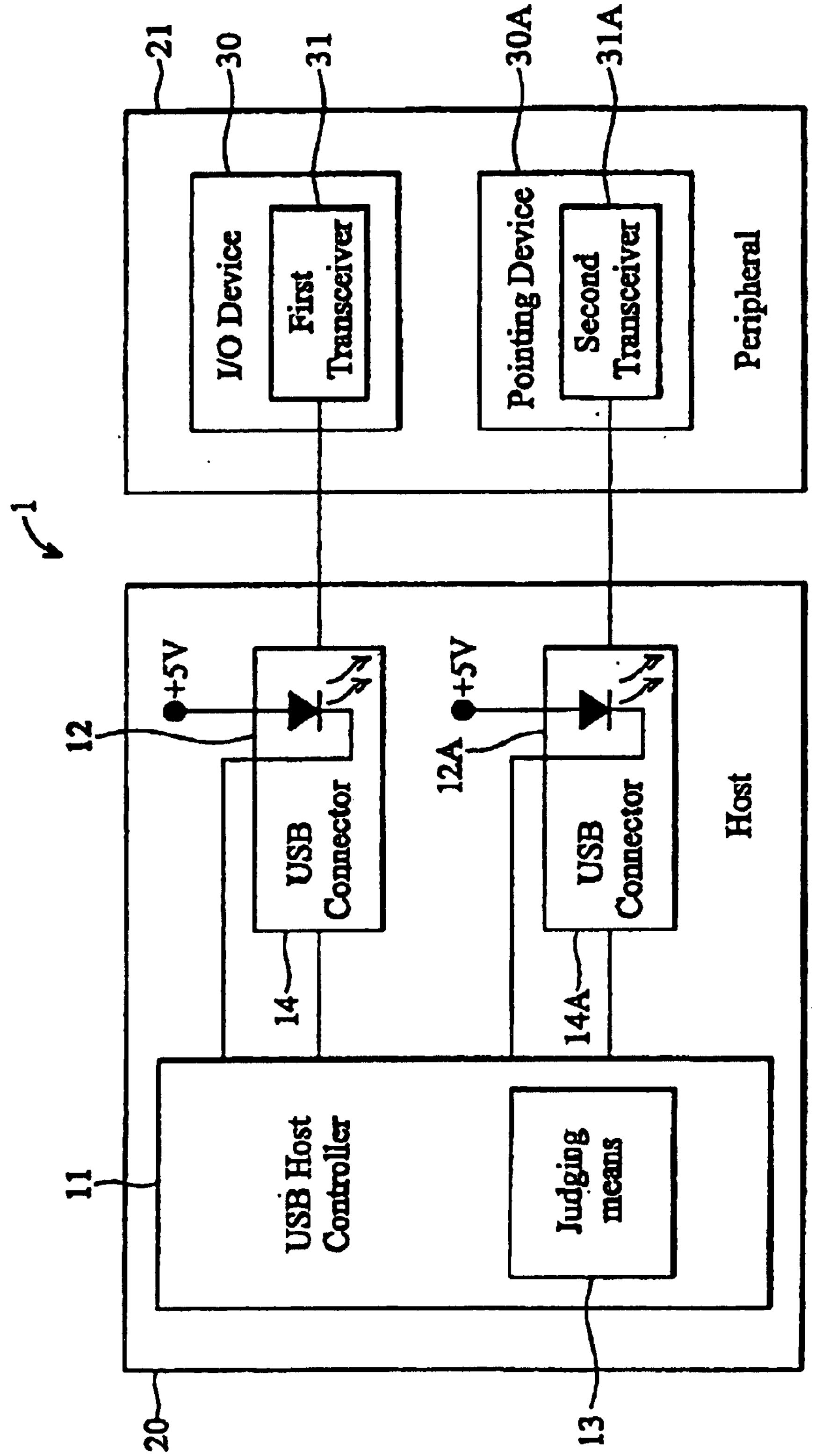
FIG. 1 is a block diagram of an identification system that may indicator the edition of a connecting interface of a computer in accordance with the present invention.

Referring to the drawings and initially to FIG. 1, an identification system 1 that may indicator the edition of a connecting interface, such as a USB connecting interface, of a computer in accordance with the present invention comprises a USB host controller 11, and at least one indicator 12, such as an LED, LCD or the like, electrically connected to the USB host controller 11.

The USB host controller 11 is a micro-controller that may be operated under the standard regulated by the connecting interface of the new edition, such as USB 2.0.

Preferably, the identification system 1 includes a first USB connector 14 mounted in the host 20 and connected to the USB host controller 11, a first indicator 12 mounted on the first USB connector 14, and electrically connected to the USB host controller 11, a second USB connector 14A mounted in the host 20 and connected to the USB host controller 11, and a second indicator 12A mounted on the second USB connector 14A, and electrically connected to the USB host controller 11.

The peripheral device 21 includes at least one device. Preferably, the peripheral device 21 includes an I/O device 30, such as a keyboard, and a pointing device 30A, such as a mouse, all connected to the computer. The I/O device 30 comprises a first transceiver 31 connected to the first USB connector 14, and the pointing device 30A comprises a second transceiver 31A connected to the second USB connector 14A.

The USB host controller 11 includes a judging means 13 that may judge the transmitting velocity between the host 20 of the computer and the peripheral device 21.

Preferably, the judging means 13 is embodied in a kernel manner. In practice, the first USB device 30 may be taken as an example for performing the steps of the judging means 13.

Figure 2:
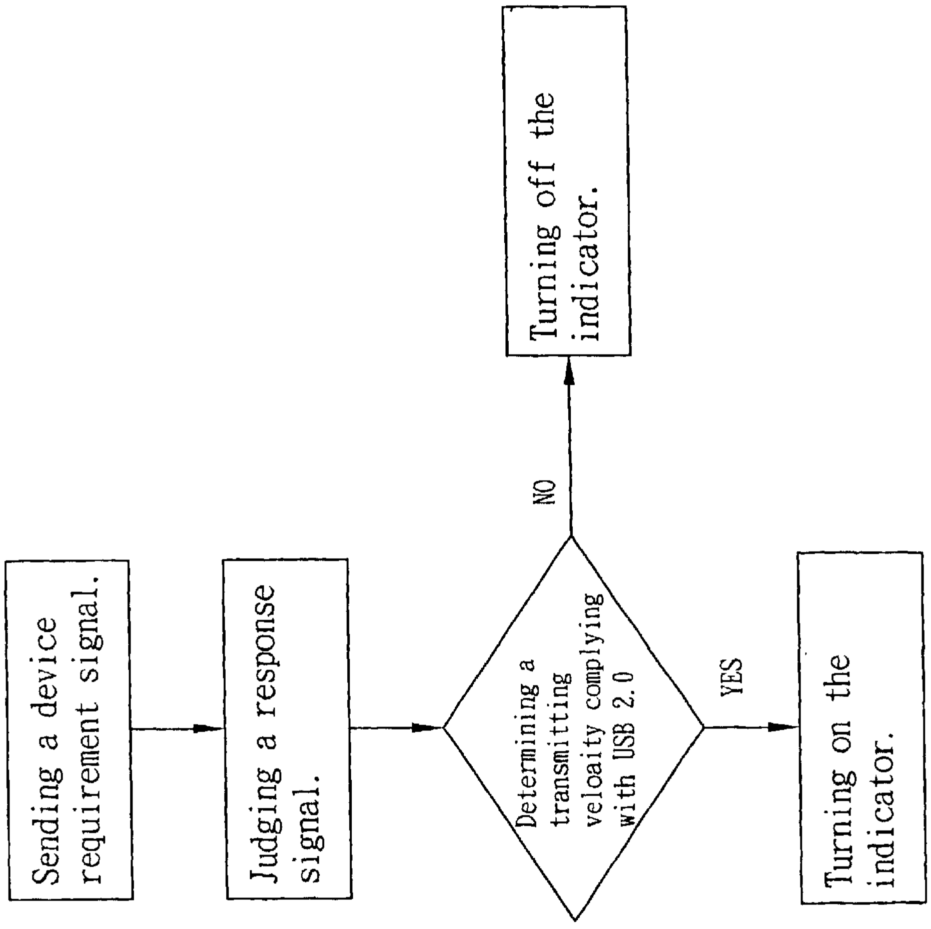
FIG. 2 is a flow chart of a judging means of the identification system that may indicate the edition of a connecting interface of a computer in accordance with the present invention.

Referring to FIG. 2 with reference to FIG. 1, the judging means 13 includes the following steps:

(a) Sending a device requirement signal to the I/O device 30;

b) Judging a response signal from the first transceiver 31 of the I/O device 30;

Determining the transmitting velocity of the I/O device 30; and (d) Determining if the transmitting velocity of the I/O device 30 reaches the velocity regulated by the standard of USB 2.0 (the connecting interface of the new edition).

In the steps (b) and (c), after the first transceiver 31 of the I/O device 30 sends a response signal through the first USB connector 14 to the USB host controller 11, the judging means 13 of the USB host controller 11 may detect the transmitting velocity of the I/O device 30. The USB host controller 11 has to mate with the transmitting velocity of the I/O device 30 to transmit the data and commands. When the I/O device 30 only supports the velocity regulated by the standard of USB 1.1 (the connecting interface of the old edition), the maximum transmitting velocity between the host 20 of the computer and the peripheral device 21 is 12 Mb/s only. When the I/O device 30 may support the velocity regulated by the standard of USB 2.0 (the connecting interface of the new edition), the maximum transmitting rate between the host 20 of the computer and the peripheral device 21 may reach 480 Mb/s. Thus, the judging means 13 of the USB host controller 11 may determine the maximum transmitting velocity between the host 20 of the computer and the peripheral device 21, so as to detect the edition that the first USB device 30 may support.

In the step (d), if the judging means 13 of the USB host controller 11 detects that the transmitting velocity of the I/O device 30 reaches the velocity regulated by the standard of USB 2.0, that is, the maximum transmitting rate, between the host 20 of the computer and the peripheral device 21, at least exceeds the maximum velocity of USB 1.1 edition, 12 Mb/s, and may reach 480 Mb/s, the judging means 13 of the USB host controller 11 may output a control signal to the indicator 12 so that the indicator 12 may light (turn on). Alternatively, if the judging means 13 of the USB host controller 11 detects that the transmitting velocity of the I/O device 30 does not reach the velocity regulated by the standard of USB 2.0, that is, the maximum transmitting rate between the host 20 of the computer and the peripheral device 21 is 12 Mb/s or less than 480 Mb/s, the judging means 13 of the USB host controller 11 output a control signal to the indicator 12 so that the indicator 12 turns off. Thus, the user may detect the maximum transmitting velocity between the host 20 of the computer and the peripheral device 21, and may detect the edition (USB1.1 or USB2.0) that the I/O device 30 may support by indication of the indicator 12.

The indicator 12 may be mounted on the USB connector 14, and may also be mounted on the face plate or back plate of the main board of the computer. The indicator 12 is preferably mounted on the USB connector 14. The USB connector 14 may be mounted on the main board of the computer, and may also be mounted on a USB hub. Preferably, the USB connector 14 is mounted on the main board of the computer.

Accordingly, in accordance with identification system 1 of the present invention, the judging means 13 of the USB host controller 11 may detect the edition (USB1.1 or USB2.0) of the connecting interface supported by the I/O device 30 of the peripheral device 21, and may detect the maximum transmitting velocity between the host 20 of the computer and the peripheral device 21. In addition, the indicator 12 may indicator the edition (USB1.1 or USB2.0) of the connecting interface supported by the USB device 30 of the peripheral device 21.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An identification system, comprising:

at least one connecting interface, each disposed between a host of a computer and a corresponding peripheral device;

a host controller, disposed in the host of the computer, including a judging means which judges a transmitting velocity of the corresponding connecting interface for outputting a control signal; and at least one indicator electrically connected to the host controller to receive the control signal to indicate the transmission velocity of the connecting interface.

2. An identification system as claimed in claim 1, wherein the host controller is a USB host controller.

3. An identification system as claimed in claim 2, wherein the USB host controller is a micro-controller that is operated under a standard transmission velocity regulated by the connecting interface of a new specification.

4. An identification system as claimed in claim 1, wherein the at least one indicator is an LED electrically connected to the host controller.

5. An identification system as claimed in claim 1, wherein the at least one indicator is an LCD electrically connected to the host controller.

6. An identification system as claimed in claim 1, wherein the connecting interface comprises a connector connected to the host controller, and the at least one indicator is mounted on the connector.

7. The identification system as claimed in claim 6, wherein the connector is a USB connector mounted in the host.

8. An identification system as claimed in claim 7, wherein the peripheral device is connected to the USB connector.

9. An identification system as claimed in claim 8, where each of the at least one peripheral devices comprises a transceiver connected to the USB connector.

10. A identification method of a system, wherein the system comprises a judging means disposed in a host controller of a computer, at least one peripheral device coupled to the host controller, and at least one indicator electrically connected to the host controller, the identify method comprising the steps of:

(a) The judging means sending a device requirement signal to the peripheral device;

(b) The judging means judging a response signal from the transceiver of the peripheral device;

(c) The judging means determining a transmitting velocity of the peripheral device; and (d) The judging means determining if the transmission velocity of the peripheral device reaches a velocity for outputting a control signal to the indicator.

11. The method as claimed in claim 10, wherein in the step (d), if the transmission velocity of the peripheral device reaches the velocity regulated by a standard of the first USB interface, the judging means of the host controller outputs a first control signal to the indicator so that the indicator is turned on.

12. The method as claimed in claim 10, wherein in the step (d), if the transmission velocity of the peripheral device does not reach the velocity regulated by the standard of a first USB interface, the judging means of the host controller outputs a second control signal to the indicator so that the indicator is turned off.

13. The method as claimed in claim 10, wherein an indicator is mounted on the USB connector.

* * * * *